United States Patent [19]

Warren et al.

[11] Patent Number: 4,577,344

[45] Date of Patent: Mar. 18, 1986

[54] VISION SYSTEM

[75] Inventors: Theodore L. Warren, Westford; Kenneth R. Whelan, Medfield; Arnold G. Reinhold, Cambridge, all of Mass.

[73] Assignee: Automatix Incorporated, Billerica, Mass.

[21] Appl. No.: 458,729

[22] Filed: Jan. 17, 1983

[51] Int. Cl.$^4$ .............................................. G06K 9/00
[52] U.S. Cl. ...................................... 382/1; 358/107; 358/108; 364/134; 382/50; 382/65
[58] Field of Search ................. 382/41, 49, 54, 50, 382/52, 53, 1, 65; 358/107, 108; 364/134

[56] References Cited

U.S. PATENT DOCUMENTS

| | | | |
|---|---|---|---|
| 4,129,853 | 12/1978 | Althauser et al. | 382/50 |
| 4,205,341 | 5/1980 | Mitsuya et al. | 382/52 |
| 4,212,057 | 7/1980 | Devlin et al. | 364/134 |
| 4,216,498 | 8/1980 | Evans et al. | 358/209 |
| 4,309,691 | 1/1982 | Castleman | 382/49 |
| 4,410,944 | 10/1983 | Kronies | 364/134 |

Primary Examiner—Leo H. Boudreau
Assistant Examiner—Joseph Mancuso
Attorney, Agent, or Firm—Richard J. Birch

[57] ABSTRACT

A system for sensing, processing and analyzing images includes a camera assembly for sensing a workpiece image and generating video signals representing the sensed images. The video signals are fed through a multiplexer to a vision processor and a display. The video signals are preprocessed and stored in the vision processor which has a shared memory. A computer controller, which has access to the shared memory via a common bus, controls operation of the vision processor in response to command signals from peripheral devices. The controller generates data signals for presenting the sensed images on a display and controlling external devices in response to the visual characteristics of the workpiece.

19 Claims, 4 Drawing Figures

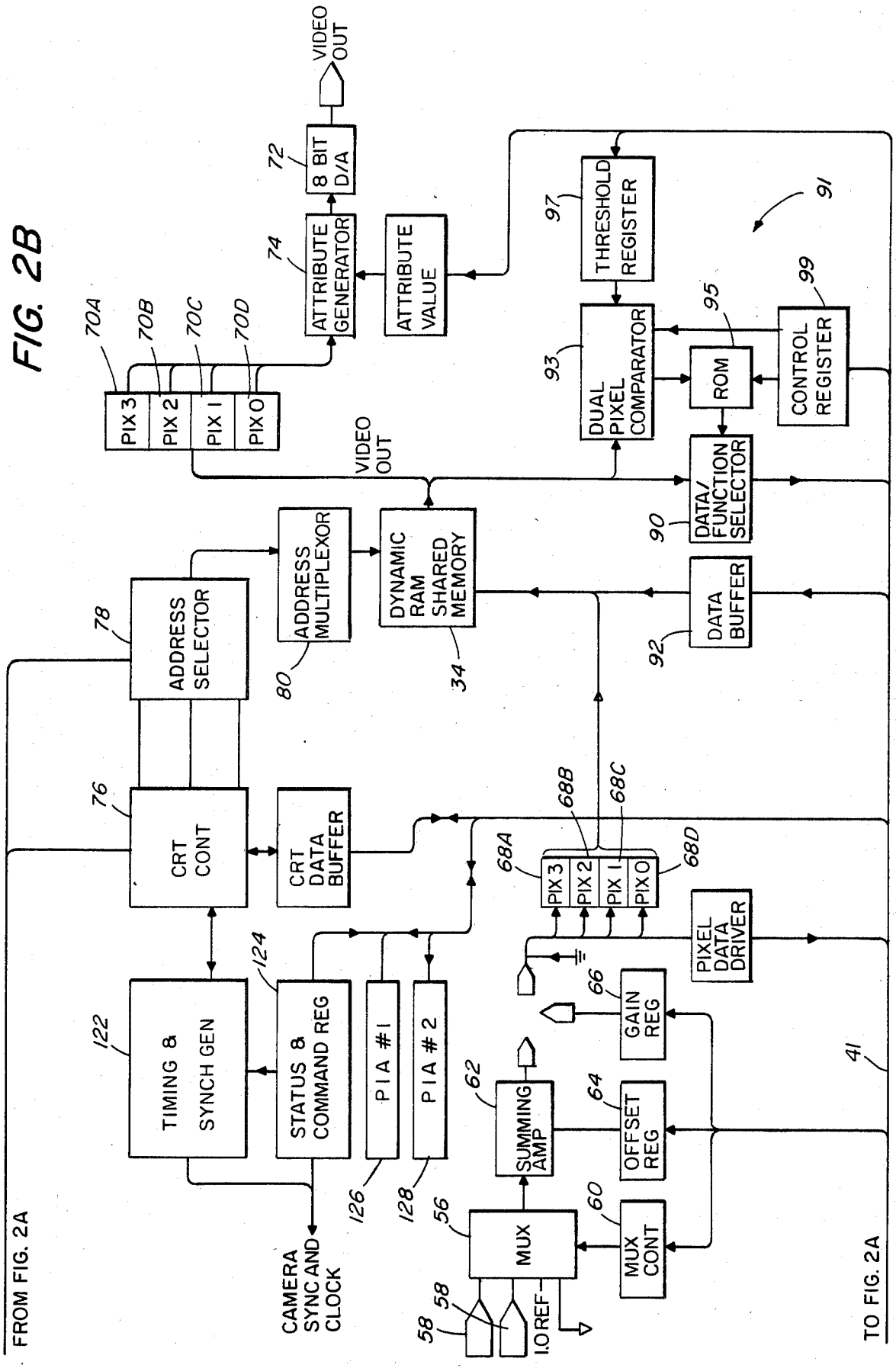

VISION SYSTEM

BACKGROUND OF THE INVENTION

1. Field of the Invention

The present invention relates to systems for analyzing images and, more particularly, is directed toward in-process inspection computer vision systems.

2. Description of the Prior Art

Computer analysis of visual images has been the subject of an enormous amount of research in the past twenty-five years. Many attempts have been made to couple computers with television cameras and develop a machine that could see. This technology has had limited success in applications such as interpreting aerial photographs, guiding "smart" bombs, counting red blood cells and chromosomes. A vision system for presenting parts or workpieces from a bulk storage location to a staging location is shown in U.S. Pat. No. 3,804,270.

In recent years, systems for processing of visual images or machine vision systems have been designed for in-process inspection of various objects. Machine vision systems have been used in cases where it is desired to determine either the shape or appearance of an object. Such systems have been met with varying degrees of success for several reasons. First, they are designed for specific purposes and are not suited for general use. Also, such specifically designed systems are costly to produce. Secondly, prior art machine vision systems are unable to handle the large amount of data represented by a television image. A need exists for an improved machine vision system.

SUMMARY OF THE INVENTION

It is an object of the present invention to provide a general purpose system for sensing, processing and analyzing images.

It is another object of the present invention to provide a general purpose machine vision system for in-process inspection of workpieces of various configurations. The vision system is characterized by a camera assembly, a vision processor with a shared memory and a computer controller. The camera assembly includes a plurality of cameras which are selectively energized for sensing and processing an image of a workpiece. The camera assembly generates video signals which are fed to the vision processor for preprocessing and storage in the shared memory. The computer controller, which has access to the shared memory through a common bus, controls the vision processor. The computer controller receives signals from peripheral devices and generates command signals for controlling the vision processor and the processing and analyzing of the video signals. The computer controller also generates data signals for presenting the processed video signals on a display and for controlling external devices in response to the sensed images.

Other objects of the present invention will in part be obvious and will in part appear hereinafter.

The invention accordingly comprises the apparatuses and processes, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIGS. 2a and 2b are a block and schematic diagram of the video processor of FIG. 1.

DETAILED DESCRIPTION OF THE PREFERRED EMBODIMENTS

Figure 1:
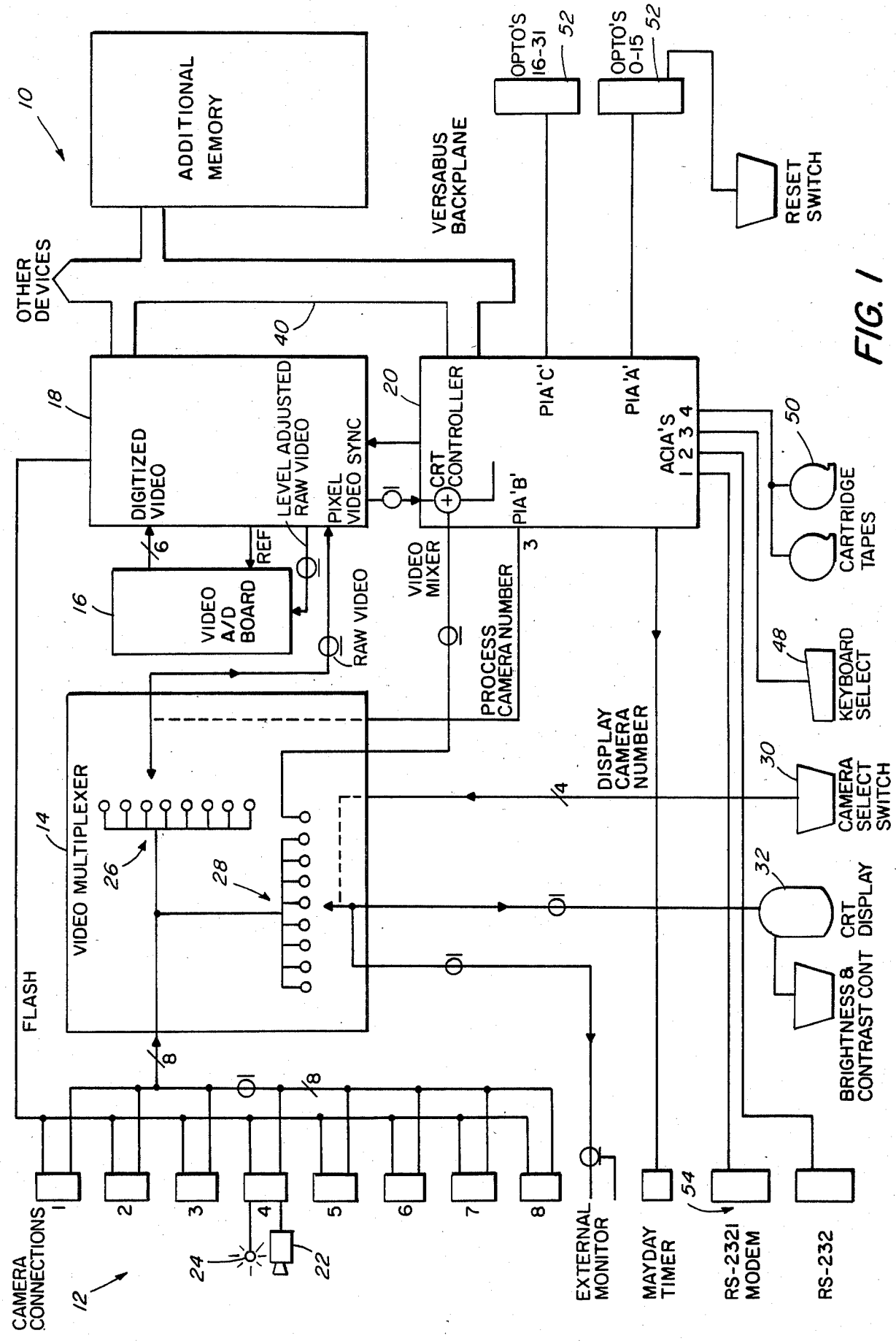
FIG. 1 is a block and schematic diagram of a vision sensing and processing system embodying the present invention.

Referring now to the drawings, particularly FIG. 1, there is shown a system 10 embodying the present invention for sensing, processing and analyzing images. In the illustrated embodiment, vision system 10 is a general purpose machine vision system for in-process inspection of workpieces having various configurations. Generally, vision system 10 includes a camera assembly 12 for sensing images of workpieces and generating analog video signals, a video multiplexer 14 for selectively switching the analog video signals representing the sensed images, an analog to digital converter 16 for digitizing the analog video signals, a slave video processor 18 for preprocessing and storage of the digitized video signals and a master computer controller 20 for controlling the video processor and processing the video signals.

Camera assembly 12 includes a plurality of cameras 22 and associated flash units 24 which are directed toward workpieces whose images are to be sensed. A command signal from video processor 18 energizes selected cameras 22 and associated flash units 24. In the illustrated embodiment of the invention, the signals generated by cameras 22 are analog video signals. In an alternative embodiment, the signals generated by cameras 22 are digital video signals. The analog video signals generated by cameras are applied to video multiplexer 14 which includes a plurality of switches 26 and 28. Switches 28, for example electronic switches, are controlled by a display camera number signal from a camera select switch 30. Switches 28 determine which analog video signals from a selected camera 22 are applied to a display 32. Switches 26, for example electronic switches, are controlled by a process camera number signal generated from computer controller 20. Switches 26 determine which camera 22 analog video signals are applied to video processor 18. Raw video signals which pass through switches 26 are applied to video processor 18. The raw video signals are level adjusted in vision processor 18 to compensate for system errors and returned to analog to digital converter 16. The level adjusted raw video signal is digitized to a six bit or eight bit binary signal in analog to digital converter 16 and returned to video processor 18 for preprocessing and storage.

Figure 2A:
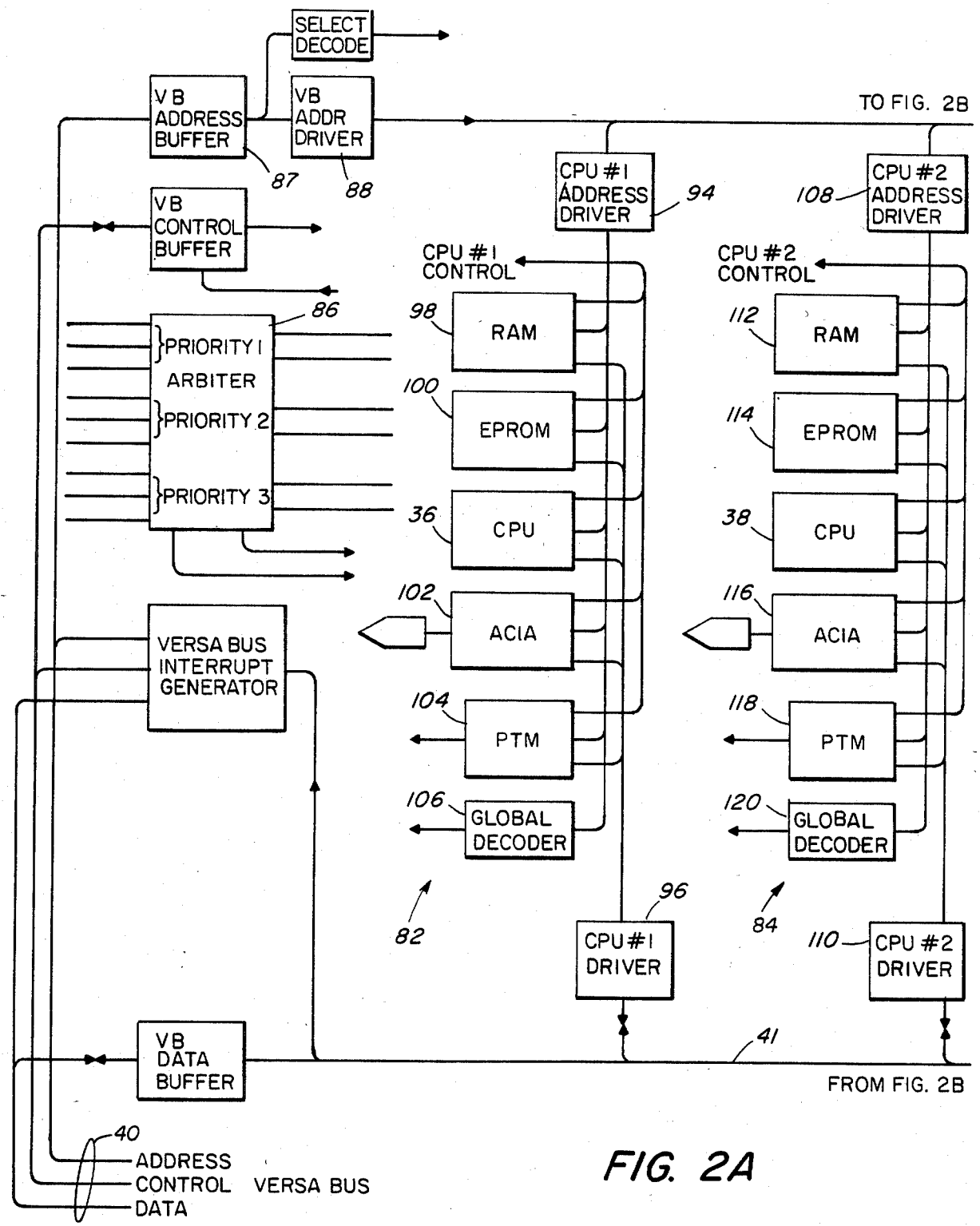
Figure 3:
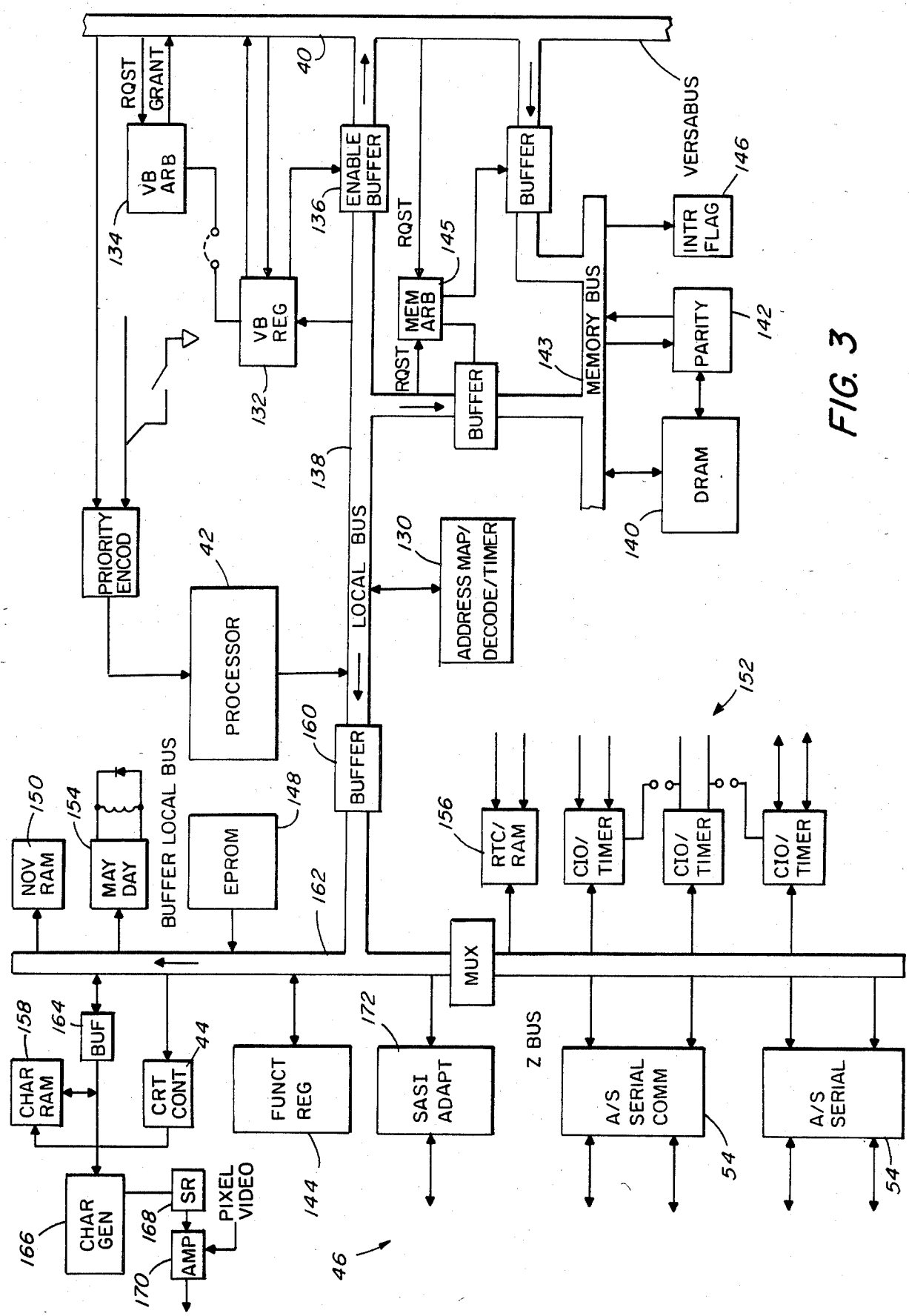
FIG. 3 is a block and schematic diagram of the computer controller of FIG. 1.

As hereinafter described in connection with FIG. 2, video processor 18, for example a micro-programmable video signal processor, includes a shared memory 34, for example a dynamic random access memory, for storing one or more picture images and central processing units 36 and 38 for processing video data. As shown in FIG. 3, computer controller 20 includes a processor 42, a display controller 44 and various input/output devices 46, which communicate with a keyboard 48, cartridge tapes 50, optical isolators 52 and communication links 54. Video processor 18 communicates with computer controller 20 through a bus 40, for example a microprocessor bus such as that identified by Motorola, Inc. as VERSAbus. Computer controller 20 inputs to shared memory 34 in video processor 18 by writing into the memory via bus 40.

In the illustrated embodiment, video data is preprocessed in video processor 18 and final processing is completed in computer controller 20. The digitized video signals are subjected to various software processing including comparison with previously stored information, computerized interpretation of the digitized video to develop and extract features which are used for further processing. The results of the processing of the digitized video signals can include a determination as to whether a particular workpiece is within specifications, its position on a work table or writing on a label. The details of vision processor 18 and control computer 20 are shown in FIGS. 2 and 3, respectively.

Vision processor 18 provides control computer 20 with certain vision capabilities including picture data storage, processing and display. Video processor 18 includes a four into one multiplexer 56 having two input ports 58, each port being able to support one multiplexer 14, each multiplexer 14 being capable of receiving input video signals from sixteen cameras 22. Accordingly, vision system 10 has the capability of supporting thirty-two cameras 22. Multiplexer 56, which is controlled by a multiplexer controller 60, also receives a one volt reference and a zero volt reference. The one volt reference and the zero volt reference are used to calibrate vision system 10. The raw video signals at the output of multiplexer 56 are applied to a summing amplifier 62 which takes the raw video signal and adds to it an offset analog voltage from an offset register 64, for example a digital to analog converter. The signal at the output of summing amplifier 62 is a level adjusted raw video signal which is applied to analog to digital converter 16. A gain register 66 is also applied to analog to digital converter 16, this reference signal being an analog signal which is under software control.

The digitized video signals in the form of six or eight bit words at the output of analog to digital converter 16 are fed to video processor 18. The digitized video signals are sequentially stored, one at a time, in holding registers 68a-68d. That is, each holding register 68 stores one byte of video information. The four bytes or thirty-two bits of video information in holding registers 68a-68d are stored in shared memory 34. In order to present the video signals on display 32, the stored video signals in shared memory 34 are applied to pixel out holding buffers 70A-70D, four bytes of pixel information being read out each time. The four bytes of pixel information are time multiplexed into a single byte and applied to a digital to analog converter 72 via an attribute generator 74. The digitized video signals applied to digital to analog converter 72 are converted to analog video signals and applied to computer controller 20.

The addresses for storing and displaying video information in shared memory 34 are generated from a CRT controller 76 which includes a starting address register (not shown) that are loaded to point to a selected starting address in the shared memory. CRT controller 76 generates sequential memory addresses to store the video signals in shared memory 34 starting at program locations defined by the starting address register. In a similar manner, sequential addresses for the video signals to be displayed on display 32 are also generated by CRT controller 76 and applied to shared memory 34 through address selector 78 and address multiplexer 80. In addition, CRT control 76 generates address signals for refreshing shared memory 34.

Computer controller 20 and central processing units 82, 84 have access to shared memory 34 via bus 41. Request signals from either computer controller 20, central processing unit 82 or central processing unit 84 are applied to an arbiter 86 which grants the request on a predetermined priority unless requests are waiting, and then by round robin. If the request is granted, arbiter 86 generates a grant signal which is applied to bus 41. The grant signal sets address selector 78 so that the address data is fed through a bus address buffer 87, a bus address driver 88 and address multiplexer 80 for application to shared memory 34. If the operation is to be a read operation, the data from shared memory 34 is applied to bus 41 through a data/function selector 90. If a write operation is requested data is applied through a data buffer 92 to shared memory 34. Central processing units 82 and 84 address shared memory 34 in a similar manner.

Vision processor 18 also includes a video processing circuit 91 for special processing of pixel information which is stored in shared memory 34. Video processing circuit 91 includes a dual pixel comparator 93, a read-only memory 95, a threshold register 97 and a control register 99. Two bytes of pixel information each pixel containing eight bits, stored in shared memory 34 are fed to dual pixel comparator 93. A threshold level from threshold register 97 is applied to dual pixel comparator 93, the signal at the output of the comparator representing pixel data which deviate from the threshold level. Control register 99 receives command signals applied to bus 40 and generates control signals which govern the operation of read-only memory 95. That is, control register 99 generates control signals which are operative to select which of several functions that read-only memory 95 is to perform, for example, pixel data exceeding the threshold level, pixel data below the threshold level, run length decoding and so forth.

Central processing unit 82 has an address driver 94 and a data driver 96. As shown in FIG. 2, central processing unit 82 also includes a random access memory (RAM) 98, an erasable programmable read only memory (EPROM) 100, central processing unit (CPU) 36, an asynchronous communications interface adaptor (ACIA) 102, a programmable timer module (PTM) 104 and a global decoder 106. Central processing unit 84 has an address driver 108 and a data driver 110. Computer processing unit 84 also includes a RAM 112, an EPROM 114, CPU 38, an ACIA 116, a PTM 118 and a global decoder 120. In the illustrated embodiment, random access memories 98 and 112 are static RAMS which constitute high speed local program memories. Static RAMS 98 and 112 allow central processors 82 and 84, respectively, to operate without any wait states at 16 MHZ. Video processor 18 also includes a timing and synchronization generator 122, a status and command register 124 and peripheral interface adapters 126, 128. As previously indicated, video processor 18 is controlled by computer controller 20, the details of which are shown in FIG. 3.

Computer controller 20 includes processor 42, for example, a sixteen-bit microprocessing unit with internal thirty-two bit address and data registers. Addresses and command signals generated by processor 42 are decoded in an address map/decoder/timer 130. When address map 130 receives a bus address, it generates a request signal which is applied to a bus register 132, for example a programmable array logic (PAL). Bus register 132 generates a request signal which is applied to bus 40. The request signal is fed to a bus arbiter 134, for example a programmable array logic (PAL), which, in response to a request signal, generates a grant signal based upon previously established priority. If the request is granted, bus arbiter 134 generates a grant signal which is fed to bus requestor 132 via bus 40. Bus requestor 132 generates an enable signal to enable a buffer 136 and a local bus 138 is activated. Local bus 138 drives bus 40 which is connected to video processor 18. When video processor 18 detects its address on bus 40, it allocates access to shared memory 34.

In addition to having access to shared memory 34, processor 42 includes a dynamic random access memory 140 (DRAM) with byte parity. Single bit DRAM errors (byte wide) are detectable by a parity detection unit 142. Parity detection unit 142 generates a odd parity flag bit with each byte written into memory 140 and checks for odd parity with each byte read via a memory bus 143. When an error is detected, a memory error signal is generated for local access and a bus erro signal is generated for bus 40. Either type of error signal will be latched and interpreted as a maskable interrupt when detected by computer controller 20. Operation of parity detection unit 142 can also be verified through use of one of the special function registers 144. When special function register 144 is set, the wrong parity bit is written into shared memory 34 during memory writes. Then, when the effected bytes are subsequently read from memory 34, a parity error should be detected. Computer controller 20 also includes a memory arbiter 145 and a flag interrupt generator 146 which enables multiple processors on bus 40 to signal one another, a maskable interrupt being generated from an interrupt generator 146 to processor 42 when set. Computer controller 20 has a non-volatile random access memory (NOVRAM) 150 which provides 256×4 bits of nonvolatile storage for recording special information, such as board serial number, revision number, service history etc.

Computer controller 20 has three counter-timer input output (CIO) devices 152 which provide six versatile parallel ports and nine programmable timers. Any port can be programmed to function as control-type port with the direction of each bit individually programmable. Each port includes pattern recognition logic which allows interrupt generation when a specific pattern is detected by either level or edge sensing. The second byte from each CIO device 152 also provides direct access to two of the internal timers. The CIO timers 152 are 360 bit counters, two of which can be linked together. Computer controller 20 also has eight versatile serial communication channels 46. A MAY DAY timer 154 is a retriggerable one shot that opens when processor 42 is not periodically updated by the software. The updating is accomplished by writing a "zero" followed by a "one" to the special function register 144. Computer controller 20 also includes a real time clock 156 which includes a complete time-of-day clock with programmable alarm, a calendar with leap year compensation and a daylight savings time options, a programmable periodic interrupt, and fifty bytes of general purpose RAM. The time, calendar and alarm are presented in binary or BCD.

In the illustrated embodiment, CRT controller 44 is capable of displaying one hundred twenty-eight ASCII characters with lower case descenders and sixty-four graphics characters. In addition, the characters are displayable with any combination of the following attributes: reverse video, character blank, character blink, underline, strike-thru or manual. They are selected through a character RAM 158 by substituting the attribute field for the character. Character command signals on local bus 138 are applied through a buffer 160 to a buffered local bus 162. The command signals are then fed through a buffer 164 to a character generator 166. Character signals generated by character generator 166 are applied to a shift register 168 and an amplifier 170 for application to display 32. A SASI adaptor 172 provides computer controller 20 with an I/O port to a SASI bus (not shown), a widely supported intelligent interface to mass storage devices.

Bus requester 134 allows computer controller 20 to become a bus master. When a bus access is initiated, requester 134 enters the bus request cycle and acquires bus 40 when the bus grant signal at the requesters level is active. It then waits until the current bus cycle has completed before enabling computer controller 20 to drive bus 40. This allows arbitration to take place while bus 40 is active. Requester 132 releases bus 40 when it is requested by another master at any priority level. The request is automatically initiated when processor 42 accesses an address which is mapped onto bus 138 from address map 130 when processor 42 acknowledges a bus interrupt or when timer 130 is active. Timer 130 allows computer controller 20 to anticipate a bus cycle, and therefore perform the arbitration overhead before the bus cycle automatically starts. This allows two bus masters to interleave memory to memory transfers with little or no sacrifice in performance. Arbiter 134 resolves conflicts when more than one bus master request bus 40.

In summary, vision system 10 is an in-process inspection and process control system in which cameras 22 sense images of workpieces. Analog video signals which represent the sensed images are fed through video multiplexer 14 to video processor 18 and display 32. The analog video signal is level adjusted in video processor 18 and applied to video to analog converter 16 where it is digitized and returned to the video processor for preprocessing and storage. Computer controller 20, a master device, controls the operation of video processor 18, a slave device, through common bus 40, the computer controller and video processor having access to shared memory 34. Computer controller 20 generates command signals responsive to the sensed images for controlling peripheral devices.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A system for sensing, processing and analyzing images, said system comprising:
   (a) a plurality of camera means for sensing images and generating video signals defining said sensed images;
   (b) vision processing means communicating with said camera means for processing said video signals, said vision processing means including at least two central processing units, shared memory means for storing said video signals during all stages of processing of said video signals and internal bus means communicating with each said central processing unit and with said shared memory means;

(c) external bus means communicating with said vision processing means, said external bus means providing communication with at least the shared memory means;

(d) computer controller means communicating with said shared memory means through said external bus means, said computer controller means at least generating command signals for controlling said vision processing means;

(e) display means connected to said computer controller means, selected image signals being presented on said display means; and, (f) switch means for selectively switching said video signals generated by said camera means, selected ones of said video signals being applied to said vision processing means and said display means.

2. The system as claimed in claim 1 wherein said video signals generated by said camera means are analog video signals and wherein said vision processing means includes analog-to-digital converter means and level and gain adjusting means, said level and gain adjusting means connected to said switch means and said analog-to-digital converter means, said analog video signals being applied to said level and gain adjusting means from said switch means and then to said analog-to-digital converter means, said analog-to-digital converter means digitizing said analog video signals applied thereto from said level and gain adjusting means.

3. The system as claimed in claim 1 wherein said vision processing means includes a vision processor arbiter with each said central processing unit generating request signals for access to said shared memory means, said request signals being fed to said vision processor arbiter, said vision processor arbiter generating grant signals on a priority basis with access to said shared memory means being controlled by said vision processor arbiter.

4. The system as claimed in claim 3 wherein said vision processor means includes a plurality of holding registers for sequentially storing said digitized video signals, each said holding register holding one byte of video information, said bytes of video information being stored in said shared memory means.

5. The system as claimed in claim 4 wherein said vision processor means includes a plurality of holding buffers, the number of holding buffers corresponding to the number of holding registers, said bytes of video information stored in said shared memory means being fed to said holding buffers and time multiplexed into a single byte.

6. The system as claimed in claim 5 wherein said computer controller means includes a computer controller processor for at least generating command signals for controlling said vision processor means and a computer controlling arbiter for generating request and grant signals in response to address signals generated by said computer controller processor, said computer controller processor having access to said shared memory means through said external bus means.

7. The system as claimed in claim 1 wherein said switch means is a multiplexer having first and second sets of electronic switches, said video signals generated by said camera means fed to said vision processing means through said first set of switches, said video signals generated by said camera means fed to said display means through said second set of switches.

8. A system for image sensing, processing and analyzing, said system comprising:

(a) camera means for sensing images and generating analog video signals defining said sensed images;

(b) multiplexer means communicating with said camera means for selectively switching said analog video signals;

(c) analog-to-digital converter means connected to said multiplexer means, said analog-to-digital converter means digitizing said analog video signals applied thereto from said multiplexer means;

(d) vision processor means connected to said analog-to-digital converter means, said vision processor means processing said digitized signals, said vision processor means including shared memory means for storing said processed digitized signals and at least two central processing units;

(e) internal bus means communicating with said vision processor means, said central processing units communicating with said shared memory means via said internal bus means;

(f) external bus means communicating with said vision processor means, said external bus means providing communication with at least the shared memory means of said vision processor means; and, (g) computer controller means communicating with said vision processor means through said external bus means, said computer controller means having access to said shared memory means through said external bus means, said computer controller means generating command signals for controlling said vision processor means.

9. The system as claimed in claim 8 wherein said vision processor means includes computer controlled level adjust means, said analog video signal at an output of said multiplexer means being level adjusted by said level adjust means and variable gain digitized in said analog-to-digital converter means, said digitized signal at an output of said analog-to-digital converter means being a level and gain adjusted digitized video signal.

10. The system as claimed in claim 9 wherein said vision processor means includes a plurality of holding registers for sequentially storing said level adjusted digitized video signals, each said holding register holding one byte of video information, said bytes of video information being stored in said shared memory means.

11. The system as claimed in claim 10 wherein said vision processor means includes a plurality of holding buffers, the number of holding buffers corresponding to the number of holding registers, said bytes of video information stored in said shared memory means being fed to said holding buffers and time multiplexed into a single byte.

12. The system as claimed in claim 11 wherein said vision processor includes a CRT controller for generating address memory signals for storing video information at selected address locations in said shared memory means.

13. The system as claimed in claim 8 wherein said vision processor means includes a vision processor arbiter, each said central processing unit generating request signals for access to said shared memory means, said request signals being fed to said vision processor arbiter, said vision processor arbiter generating grant signals on a priority basis with access to said shared memory means by said central processing units being controlled by said vision processor arbiter.

14. The system as claimed in claim 13 wherein said computer controller means includes a computer controller processor for generating command signals for controlling said vision processor means, said computer controller processor having access to said shared memory through said bus means.

15. The system as claimed in claim 14 wherein said computer controller means includes a computer controller arbiter for generating request and grant signals in response to address signals generated by said computer controller processor, access to said shared memory means by said computer controller means being controlled by said computer controller arbiter.

16. The image and sensing system as claimed in claim 15 including display means, selected ones of said sensed images presented on said display means.

17. The system as claimed in claim 16 wherein said computer controller means includes character generating means for presenting characters on said display means.

18. A system for sensing, processing and analyzing images, said system comprising:
  (a) a plurality of camera means for sensing images and generating video signals defining said sensed images; and,
  (b) vision processing means communicating with said camera means for processing said video signals, said vision processing means including:
    (i) shared memory means for storing said video signals during all stages of processing of said video signals;
    (ii) internal bus means communicating with said shared memory means;
    (iii) at least two central processing units; and,
    (iv) a vision processor arbiter; each said central processing unit communicating with said shared memory means via said internal bus means, each said central processing unit generating request signals for access to said shared memory means, said request signals being fed to said vision processor arbiter, said vision processor arbiter generating grant signals on a priority basis with access to said shared memory means being controlled by said vision processor arbiter.
  (c) external bus means communicating with said vision processing means, said external bus means providing communication with at least the shared memory means of said vision processing means;
  (d) computer controller means communicating with said shared memory means through said external bus means, said computer controller means at least generating command signals for controlling said vision processing means; and,
  (e) means for utilizing the video signals processed by said vision processing means.

19. A system for image sensing, processing and analyzing, said system comprising:
  (a) camera means for sensing images and generating analog video signals defining said sensed images;
  (b) multiplexer means communicating with said camera means for selectively switching said analog video signals;
  (c) analog-to-digital converter means connected to said multiplexer means, said analog-to-digital converter means digitizing said analog video signals applied thereto from said multiplexer means;
  (d) vision processor means communicating with said camera means for processing said video signals, said vision processor means including:
    (i) shared memory means for storing said video signals during all stages of processing of said video signals;
    (ii) internal bus means communicating with said shared memory means;
    (iii) at least two central processing units; and,
    (iv) a vision processor arbiter; each said central processing unit communicating with said shared memory means via said internal bus means, each said central processing unit generating request signals for access to said shared memory means, said request signals being fed to said vision porcessor arbiter, said vision processor arbiter generating grant signals on a priority basis with access to said shared memory means being controlled by said vision processor arbiter;
  (e) external bus means connunicating with said vision processing means, said external bus means providing communication with at least the shared memory means of said vision processing means;
  (f) computer controller means communicating with said shared memory means through said external bus means, said computer controller means at least generating command signals for controlling said vision processing means; and,
  (g) means for utilizing the video signals processed by said vision processing means.

* * * * *